L. TAUSSIG.
SPRING AND AXLE COUPLING FOR WHEELED VEHICLES.
APPLICATION FILED NOV. 8, 1919.
1,356,669.
Patented Oct. 26, 1920.
2 SHEETS—SHEET 1.
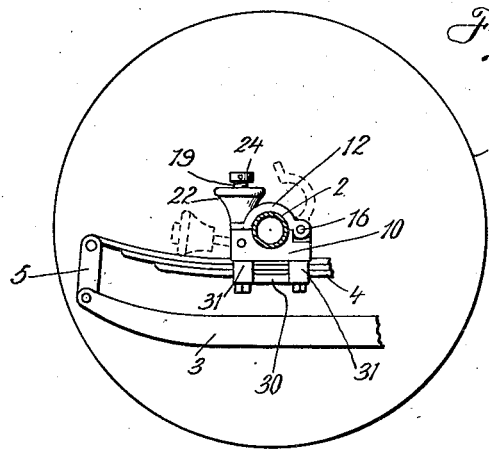
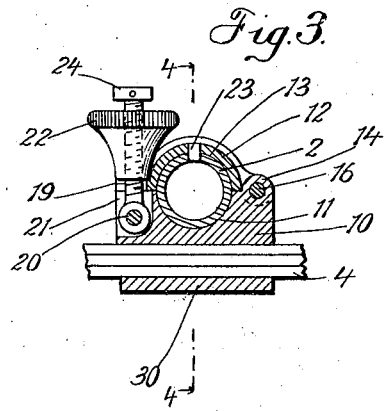
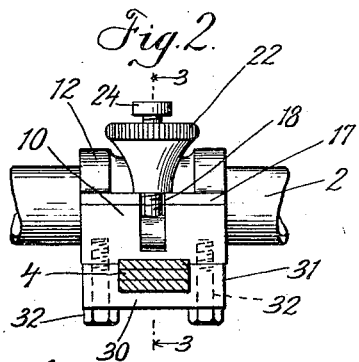
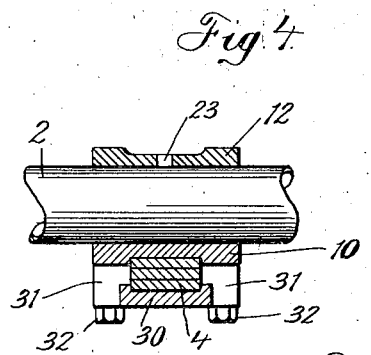
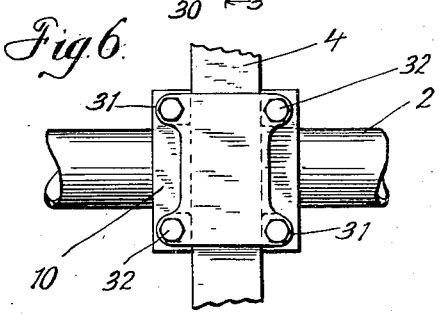
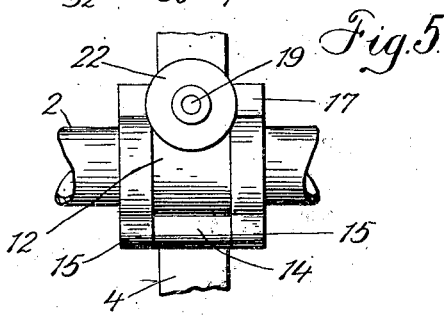
Inventor
Leo Taussig
By his Attorney
William R. Ricnard

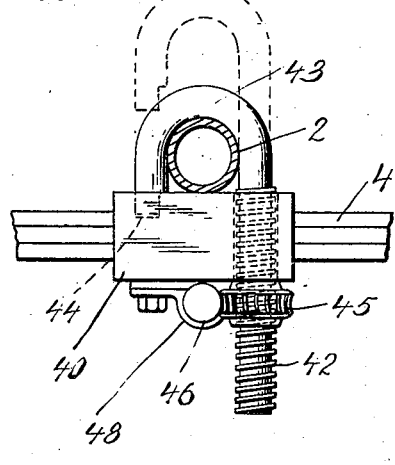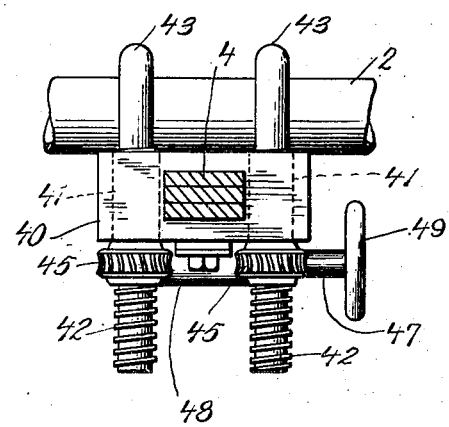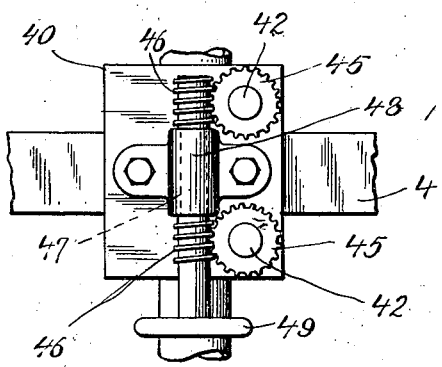

UNITED STATES PATENT OFFICE.

LEO TAUSSIG, OF NEW YORK, N. Y.

SPRING AND AXLE COUPLING FOR WHEELED VEHICLES.

1,356,669. Specification of Letters Patent. Patented Oct. 26, 1920.

Application filed November 8, 1919. Serial No. 336,711.

*To all whom it may concern:*

Be it known that I, LEO TAUSSIG, a citizen of the United States, residing at New York city, county of New York, and State of New York, have invented certain new and useful Improvements in Spring and Axle Couplings for Wheeled Vehicles, of which the following is a specification.

This invention relates to a spring and axle coupling for wheeled vehicles in general, the invention being intended more particularly, however, for application to automobiles and the like.

The invention has for an object to provide a simple form of device for securing the axles to the springs supporting the body of the vehicle in a manner to permit of ready attachment or detachment so that the wheels and axle can be readily removed as a unit when so desired.

For further comprehension of the invention, and of the objects and advantages thereof, reference will be had to the following description and accompanying drawings, and to the appended claims in which the various novel features of the invention are more particularly set forth.

Figure 1 of the drawing is a fragmentary longitudinal sectional view showing the application of the invention to the front axle of an automobile.

Fig. 2 is a side elevation of the coupling in position on the axle with the spring in transverse section.

Fig. 3 is a vertical section on the line 3—3 of Fig. 2.

Fig. 4 is a vertical section on the line 4—4 of Fig. 3.

Fig. 5 is a top side plan view of the device.

Fig. 6 is an underside plan view.

Fig. 7 is an elevation of a modified form of coupling.

Fig. 8 is an elevation at right angles to Fig. 7.

Fig. 9 is an underside plan view.

In the drawings 1 indicates one of the front wheels of an automobile and 2 the front axle which is here of tubular construction. The front portion of one of the side frame members of an underhung frame is shown at 3 and extends under the axle 2 and supports the usual leaf spring 4 in the ordinary manner the link supporting the front end of the spring being shown at 5, the relative arrangement of the frame and spring forming no feature of the present invention.

My improved coupling device comprises an intermediate block 10 which rests upon the spring and has a recess 11 in its top face, in which the axle rests. Hinged to the block 10 at one side thereof is a cap or cover 12, having a corresponding recess 13 formed therein which fits down over the axle, this cap having a hinge ear 14 which engages between a pair of hinge ears 15 on the block 10, a pintle 16 extending through these ears.

The opposite side of the cap 12 is formed with a flange 17 which is slotted as at 18 to accommodate a screw 19 hinged as at 20 in a recess 21 in the block this screw having a thumb nut 22 threaded thereon which is adapted to engage the flange 17 to hold the cap in position clamped upon the axle.

A dowel pin 23 is fixed in the cap and projects into a suitable aperture in the axle 2 to insure against turning movement of the latter. The screw 19 may have a collar 24 fixed to the outer end thereof to prevent the nut 22 from being completely unscrewed from the screw.

The leaves of the spring are clamped upon the bottom face of the block by means of a saddle 30 having upwardly projecting bosses 31 at the corners thereof, screws 32 passing upward through suitable borings in the bosses and being threaded into the block 10.

The bosses 31 are spaced apart a distance to closely engage the sides of the spring leaves, while the bottom face of the block and top face of the saddle may be formed with shallow grooves to receive the spring as clearly shown in Fig. 4.

As will be apparent, the axle 2 can be disconnected from the spring 4 by simply unscrewing the nut 22 and swinging the screw 19 out and the cap 12 back, while at the same time a rigid structure is provided when the parts are assembled, or, the cap can be raised to permit of disconnecting of the axle from the spring.

In the modification shown in Figs. 7 8 and 9 the spring is clamped in a block 40 having a pair of vertical borings 41 freely receiving screws 42 having hooked ends 43 which take over the axle the tips of these ends taking into suitable recesses such as 44 in the top of the block.

These screws 42 have worm gears 45 threaded thereon under the blocks 40, which gears are engaged by pinions 46 fixed on a common shaft 47 in a bearing 48 on the underside of the block, the shaft 47 having a handle wheel 49 fixed thereon for rotating it. By rotating the handle wheel and through it operating gears 45, the hooked end of the screws 42 can be drawn tightly down on the axle to securely lock it to the block 40.

Having thus described my invention, what I claim as new and desire to secure by Letters Patent is:—

1. A spring and axle coupling for the axle and supporting spring of a vehicle comprising a coupling member securing said spring and axle together consisting of an intermediate block having a semi-circular groove in its top face, a cap hinged to said block and having a complementary groove in its bottom face, and a saddle bolted to the bottom face of said block and clamping the spring between itself and the latter.

2. A spring and coupling for the axle and spring of a vehicle comprising a coupling device securing said spring and axle together consisting of an intermediate block having a semi-circular groove in its top face, a cap hinged to said block and having a complementary groove in its bottom face, means including a hinged screw and a nut threaded thereon for holding said cap in position, and a saddle bolted to the bottom face of said block and clamping the spring between itself and the latter.

3. A spring and axle coupling for the axle and spring of a vehicle comprising a coupling device securing said spring and axle together consisting of an intermediate block having a semi-circular groove in its top face, a cap hinged to said block and having a complementary groove in its bottom face means including a hinged screw and a nut threaded thereon for holding said cap in position, and a saddle bolted to the bottom face of said block and clamping the spring between itself and the latter, said saddle having ears on opposite sides through which said bolts pass to closely engage the sides of the spring.

4. A spring and axle coupling for the axle and supporting spring and axle together consisting of an intermediate block having a semi-circular groove in its top face, a cap hinged to said block having a complementary groove in its bottom face, a dowel pin carried therein and adapted to engage the said axle and a saddle bolted to the bottom face of said block and clamping the spring between itself and the latter.

5. A spring and axle coupling for vehicles comprising a block adapted to be rigidly secured to the spring and having a recess in one of its faces to receive an axle, a swinging cap pivoted to said block arranged to be closed over the axle and hold the same in place, and means for locking said cap in holding position over said axle.

6. A spring and axle coupling for vehicles comprising a block adapted to be rigidly secured to the spring and having a recess in one of its faces to receive an axle, a swinging cap pivoted to said block arranged to be closed over the axle and hold the same in place, and means for locking said cap in holding position over said axle, said means comprising a screw hinged to said block, and a retaining nut upon said screw adapted to engage said cap.

7. A spring and axle coupling for vehicles comprising a block adapted to be rigidly secured to the spring and having a recess in one of its faces to receive an axle, a swinging cap pivoted to said block arranged to be closed over the axle and hold the same in place, and means for locking said cap in holding position over said axle, said means comprising a screw hinged in a recess at one end of said block, a flange upon said cap normally adjacent to said screw, and a retaining nut upon said screw adapted to engage said flange.

In testimony whereof I have affixed my signature.

LEO TAUSSIG.